Sept. 23, 1969  J. G. BECK  3,468,652
PROCESS USING ROTATING MEMBERS TO LATERALLY STRETCH AND
RESTRAIN GLASS DURING FLOAT GLASS MANUFACTURING
Filed June 14, 1967  2 Sheets-Sheet 1
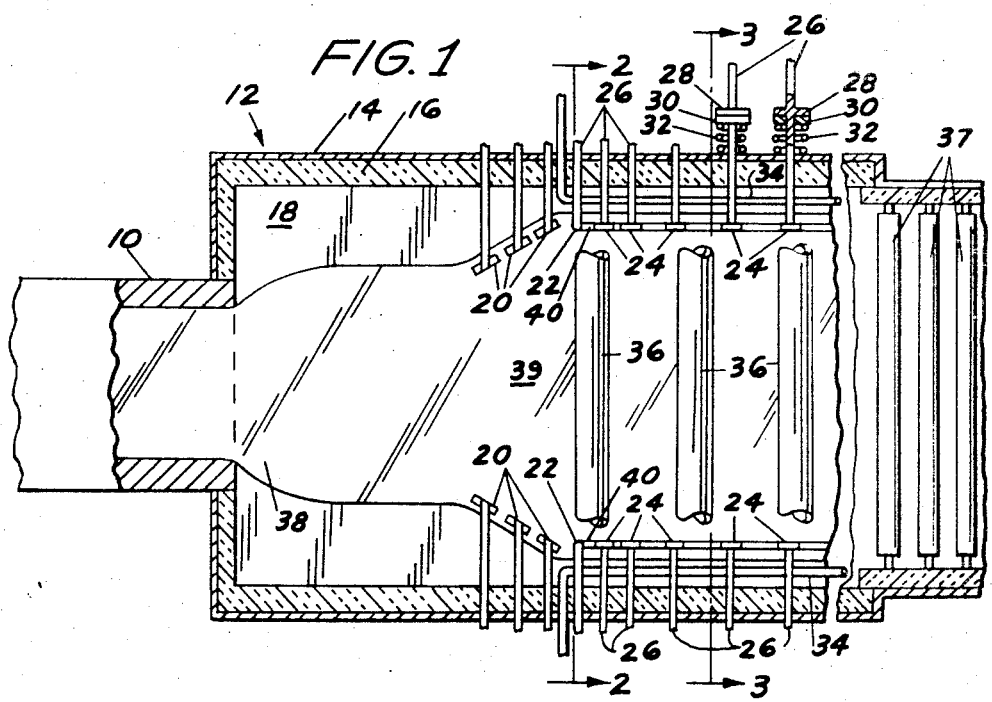
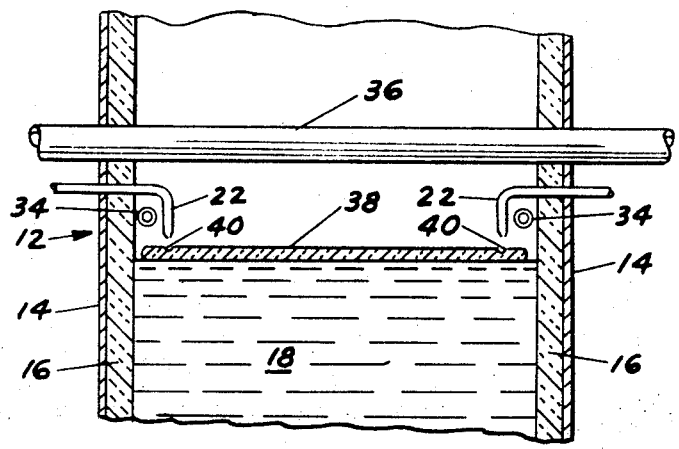
INVENTOR.
JERRY G. BECK
BY John R. Faulkner
Glenn S. Arendsen
ATTORNEYS

INVENTOR.
JERRY G. BECK

BY John R. Faulkner
Glenn S. Arendsen
ATTORNEYS

United States Patent Office 3,468,652
Patented Sept. 23, 1969

3,468,652
PROCESS USING ROTATING MEMBERS TO LATERALLY STRETCH AND RESTRAIN GLASS DURING FLOAT GLASS MANUFACTURING
Jerry G. Beck, Southfield, Mich., assignor to Ford Motor Company, Dearborn, Mich., a corporation of Delaware
Filed June 14, 1967, Ser. No. 645,940
Int. Cl. C03b 18/00
U.S. Cl. 65—91                     8 Claims

ABSTRACT OF THE DISCLOSURE

Longitudinally continuous deformations in the thickness of glass being produced by the float glass process are formed near its edges while the glass is sufficiently soft by gas issuing from gas outlets. Laterally biased rollers ride against longitudinal edges of the deformations to exert forces resisting the tendency of the glass to return to its equilibrium thickness. Simultaneously, the edges and main body of the glass sheet are cooled to provide sufficient inherent strength in the glass to maintain its shape.

SUMMARY OF THE INVENTION

During the manufacture of continuous glass sheets by the float glass process, glass in a molten or softened state is stretched laterally by directing gas at the surface or by positioning outwardly biased mechanical rollers along the edges as disclosed in U.S. patent applications Ser. Nos. 572,497 filed Aug. 15, 1966 and 482,510, now abandoned, filed Aug. 27, 1965, assigned to the assignee of this application and incorporated herein by this reference. The glass tends to return to its equilibrium thickness after stretching, however, and must be restrained from doing so until it has been cooled sufficiently.

This invention provides a process for restraining the glass from returning toward its equilibrium thickness that comprises deforming the glass ribbon near its longitudinal edges while the glass is sufficiently soft to be readily susceptible to these deformations and coacting biased structural members with the deformations to exert forces tending to prevent the ribbon from returning to its equilibrium thickness. Simultaneously, the longitudinal edges and main body of the ribbon are cooled to impart sufficient structural strength to the deformations and the ribbon to resist the tendency to move toward equilibrium thickness. The ribbon is drawn through the float chamber while being cooled into structurally integral glass capable of being handled by normal mechanical rollers or conveyors without distorting, marring, or suffering other defects.

BRIEF DESCRIPTION OF THE DRAWINGS

FIGURE 1 is a plan view showing gas producing grooves along the longitudinal edges of a heat softened glass ribbon immediately after gas jets have stretched the ribbon laterally. FIGURE 1 also shows cooling coils extending longitudinally along the edges of the ribbon and laterally across the ribbon along with rollers coacting with the grooves to exert outwardly directed forces on the ribbon. FIGURE 2 is a sectional view taken along line 2—2 of FIGURE 1 showing the gas nozzles producing grooves along the longitudinal edges of the ribbon.

DETAILED DESCRIPTION

Figure 3:
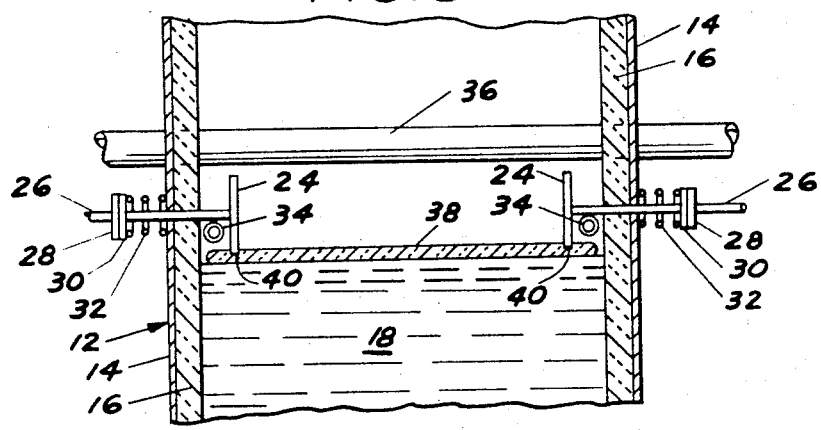
FIGURE 3 is a sectional view taken along line 3—3 of FIGURE 1 showing spring loaded rollers positioned in the grooves to restrain the tendency of the ribbon to move toward equilibrium.

Referring to FIGURE 1 a spout 10 connects a glass melting and refining furnace (not shown) with the interior of a float chamber represented by numeral 12. Float chamber 12 is similar to the float chamber described in Basler et al., patent application U.S. Ser. No. 404,247 filed Oct. 16, 1964, now U.S. Pat. No. 3,332,-763, the disclosure of which is incorporated herein by this reference, and comprises an enclosing housing 14 that is lined by refractory material 16. Molten metal 18 such as tin covers the bottom of the interior of chamber 12.

A plurality of gas outlets 20 are positioned inside chamber 12 downstream, or to the right in FIGURE 1, from spout 10. Outlets 20 are directed downward and laterally outward as described in U.S. patent application Ser. No. 572,497. Downstream of outlets 20, a downwardly directed gas outlet 22 is located on each side of the interior of chamber 12. Downstream and longitudinally in line with outlets 22, a plurality of structural members in the form of rollers 24 are spaced at increasing intervals. Each of the rollers 24 is mounted on a shaft 26 that extends through the side walls of chamber 12. Outside of chamber 12 a disc 28, two of which are shown, is fastened to each shaft 26. A bias plate 30 slides on the inside surface of each disc 28 and a compression spring 32 concentric with each shaft 26 bears against the side walls of chamber 12 and each bias plate 30.

Longitudinally extending cooling coils 34 pass underneath shafts 26 and the inlet tubing for fluid outlets 22 (see also FIGURES 2 and 3). Cooling coils 34 are located slightly outboard of rollers 24 and gas outlets 22. Additional cooling coils 36 pass laterally through chamber 12 and are located above gas outlets 22 and rollers 24 at appropriate positions. Power driven rolls 37 located at the end of the float chamber draw the glass sheet through the float chamber.

OPERATION OF FIGURES 1, 2 AND 3

Spout 10 delivers molten glass from the furnace onto the surface of molten metal 18 in the form of a ribbon 38. As ribbon 38 moves along the surface of metal 18 it spreads out until it reaches an equilibrium thickness of about 0.280 inch determined by its surface tension and other physical factors. Gas issuing from gas outlets 20 impinges on the surface of ribbon 38 and exerts an outwardly directed force that laterally stretches the ribbon in the manner described in U.S. patent application Ser. No. 572,497. Powered rolls 37 exert a longitudinal force on the ribbon that draws the ribbon through the float chamber and, if desired, provides additional stretching.

Unless the stretched ribbon is restrained until it can be cooled, the ribbon tends to return to its equilibrium thickness. The restraint is provided in the following manner. Gas issuing from outlets 22 is directed downwardly onto the ribbon near its longitudinal edges to form grooves 40 in the ribbon as shown in FIGURE 2. Rollers 24 are shaped to ride in grooves 40 as shown in FIGURE 3 with the shape of the rollers corresponding to the shape of the grooves, and springs 32 bias rollers 24 laterally outward so rollers 24 coact with grooves 40 to exert the proper restraining forces on the ribbon.

Coolant passing through coils 34 cools the edges of ribbon 38 to impart sufficient rigidity thereto and coolant passing through coils 36 cools the main body of the ribbon. As the ribbon cools, less restraining force is needed and rollers 24 are spaced progressively farther apart.

CONSTRUCTION AND OPERATION OF FIGURE 4

Figure 4:
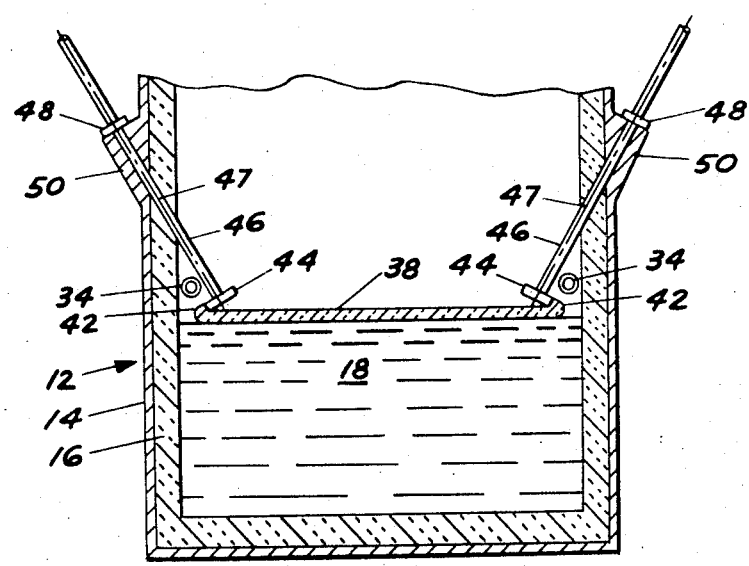
FIGURE 4 is a sectional view of an alternate embodiment taken at the equivalent position of line 3—3 of FIGURE 1 in which ridges are formed at the edges of the ribbon and rollers having their rotational axes at angles to the plane of the ribbon bear against the ridges.

In the embodiment shown in FIGURE 4, nozzles 22 are positioned so the gas issuing therefrom forms ridges 42 at the edges of ribbon 38. Rollers 44 are mounted on shafts 46 having rotational axes 47 positioned at an angle relative to the plane of the ribbon so rollers 44 bear on ridges 42.

Shafts 46 extend outside of chamber 12 where each shaft has a disc 48 attached thereto. Discs 48 ride on bosses 50 fastened to the exterior of the side walls 12 with the surfaces of bosses 50 that contact discs 48 being normal to the rotational axes 47 of shafts 46.

Rollers 44 exert forces on ridges 42 resisting the tendency of the ribbon to return to its equilibrium position as described above. Biasing springs are not necessary in the FIGURE 4 construction although the angle of axis 47 relative to the plane of ribbon 38 can be decreased to the point where biasing springs are desirable. Biasing springs producing forces acting toward the ribbon can be used to impart vertical stability to the ribbon at higher angles. Nozzles 20 can be designed to form a natural ridge on the edges of the ribbon, thereby eliminating the need for additional nozzles 22.

The gas issuing from nozzles 20 and 22 usually is a mixture of the atmosphere in the interior of chamber 12 plus a small amount of a reducing gas such as hydrogen or carbon monoxide to react with any oxidizing gases that might be present. A typical atmosphere consists essentially of a major portion of nitrogen with minor amounts (about 4 percent) of reducing gases. Preferably, the atmosphere contains no more than trace amounts of oxygen, carbon dioxide and water vapor, and means for removing the latter gases can be included in the circulating systems for nozzles 20 and 22. Water is used as the coolant in coils 34 and 36. The upstream rollers are made of materials that do not stick to the glass sheet such as graphite or boron nitride coated steel. Downstream rollers can be made of less expensive materials such as uncoated steel since the ribbon has been cooled sufficiently to eliminate any sticking tendencies. The roller surfaces contacting the glass usually are knurled or otherwise roughened to prevent slipping, and the drag provided by bias plates 30 acts through the rollers to resist the longitudinal forces exerted on the ribbon by the power driven rolls at the end of the float chamber, thereby inherently preventing the longitudinal forces from breaking ribbon continuity by pulling the molten glass away from spout 10. Additional drag can be provided by associating appropriate means with shafts 26. Alternatively, longitudinal force resistance can be provided by other means and electric motors associated with shafts 26 drive the rollers to assist in longitudinal stretching.

Thus this invention provides a process for laterally restraining a heat softened glass ribbon tending to move toward an equilibrium thickness during manufacture by the float process. The rotating structural members can be used to hold the ribbon from laterally contracting during longitudinal stretching under the longitudinal forces exerted by the powered rolls at the end of the float chamber, after lateral stretching as disclosed, or from laterally expanding during the manufacture of glass thicker than equilibrium. Additionally, the structural members prevent the transmission of longitudinal stretching forces through the partially cooled ribbon to the molten glass flowing from the furnace.

What is claimed is:

1. A process for laterally restraining glass having a thickness differing from equilibrium thickness during its manufacture by the float process while the glass ribbon is floating on a molten metal bath within a float chamber that comprises forming a deformation with longitudinal edges in the thickness of the ribbon near its longitudinal edges by directing gas from gas outlets while the glass is sufficiently soft to be readily susceptible to said deformation, said deformations existing essentially in the upper surface of the ribbon only, positioning rotating structural members so said members ride against longitudinal edges of the deformations to exert forces tending to prevent the ribbon from returning to its equilibrium thickness, simultaneously cooling at least the longitudinal edges and deformations to impart sufficient structural strength to said deformations to resist the equilibrium tendency of the ribbon, and drawing the ribbon through the float chamber while cooling the sheet into structurally integral glass.

2. The process of claim 1 in which the deformations are formed by directing gas from gas outlets positioned near the longitudinal edges of the ribbon at the surface of the ribbon.

3. The process of claim 2 in which the structural members are rotating wheels, and comprising resiliently urging said wheels in a direction such that the wheels exert forces on the deformations resisting the equilibrium tendency of the ribbon.

4. The process of claim 3 comprising directing the gas at the ribbon at an angle approximately perpendicular to the plane of the ribbon and in which the deformations are grooves formed in the ribbon.

5. The process of claim 3 in which the deformations are ridges formed near the edges of the ribbon.

6. The process of claim 5 comprising holding the entire width of the ribbon adjacent the rotating wheels essentially in a plane and positioning the rotational axes of the rotating wheels at an angle relative to the plane.

7. The process of claim 1 comprising holding the entire width of the ribbon adjacent the rotating structural members essentially in a plane and positioning the rotating axes of the structural members at an angle relative to the plane.

8. The process of claim 1 in which the deformations are ridges formed near the edges of the ribbon.

References Cited

FOREIGN PATENTS 732,043 2/1943 Germany.
635,217 11/1963 Republic of South Africa.

S. LEON BASHORE, Primary Examiner

E. R. FREEDMAN, Assistant Examiner

U.S. Cl. X.R.

65—65, 99, 182, 200, 201